United States Patent [19]

Balling, Sr.

[11] 4,261,676

[45] Apr. 14, 1981

[54] BALE CARRIER

[76] Inventor: Bernard L. Balling, Sr., R.R. #2, Box 180, Colton, S. Dak. 57018

[21] Appl. No.: 948,577

[22] Filed: Oct. 4, 1978

[51] Int. Cl.³ .............................................. B60P 1/48
[52] U.S. Cl. ................................... 414/24.5; 298/18; 414/470; 414/486; 414/493; 414/501; 414/525 R; 414/552
[58] Field of Search ............... 414/492, 493, 501, 509, 414/517, 525, 546, 551, 552, 555, 685, 739, 740, 911, 24.5, 24.6, 470, 486; 298/18

[56] References Cited

U.S. PATENT DOCUMENTS

| | | | |
|---|---|---|---|
| 2,792,136 | 5/1957 | Abbott | 414/551 |
| 2,954,886 | 10/1960 | Nelson | 414/552 |
| 3,922,036 | 11/1975 | Kalsbeck et al. | 298/18 |
| 3,924,765 | 12/1975 | Hostetler | 414/501 |
| 4,117,940 | 10/1978 | Adam | 414/911 X |

Primary Examiner—Robert G. Sheridan
Attorney, Agent, or Firm—Robert C. Baker

[57] ABSTRACT

The bale carrier functions as a bale loading, transporting and unloading apparatus. It comprises an elongated base framework mounted on wheels, an elongated bale supporting bed aligned over and supported by the base framework, a power operated bale loader mounted on one side of the base framework as a satellite assembly near one end of the bale supporting bed, a power operated bale mounted upon the base framework at a longitudinal location proximate to the end of the bale supporting bed at which the bale loader is located, and selectively operable device for tilting the bale supporting bed to dump loaded bales therefrom over the lateral side of the base framework opposite the bale loader.

19 Claims, 9 Drawing Figures

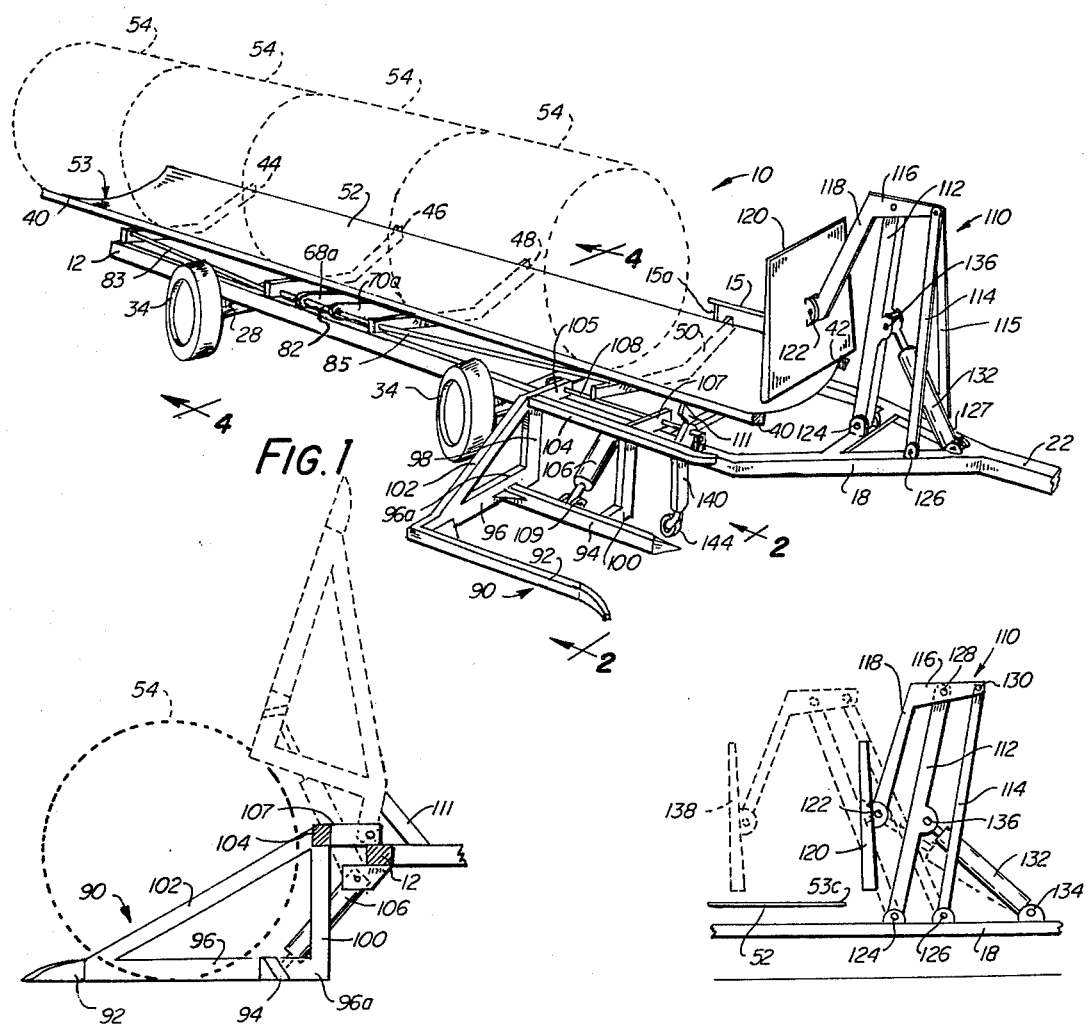
FIG. 1
FIG. 2
FIG. 3
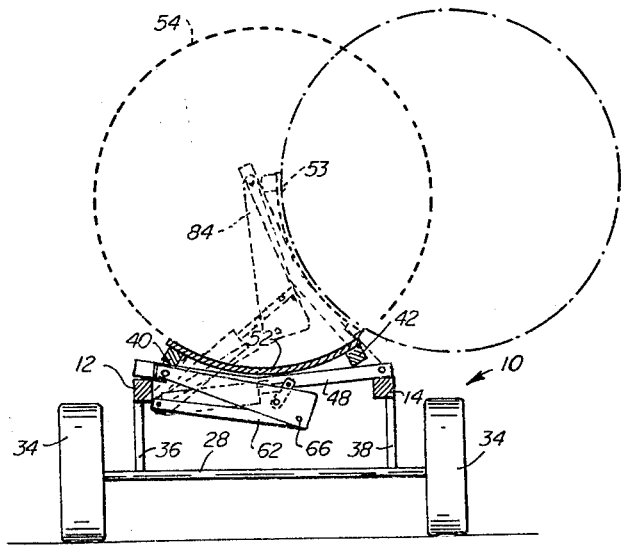
FIG. 4

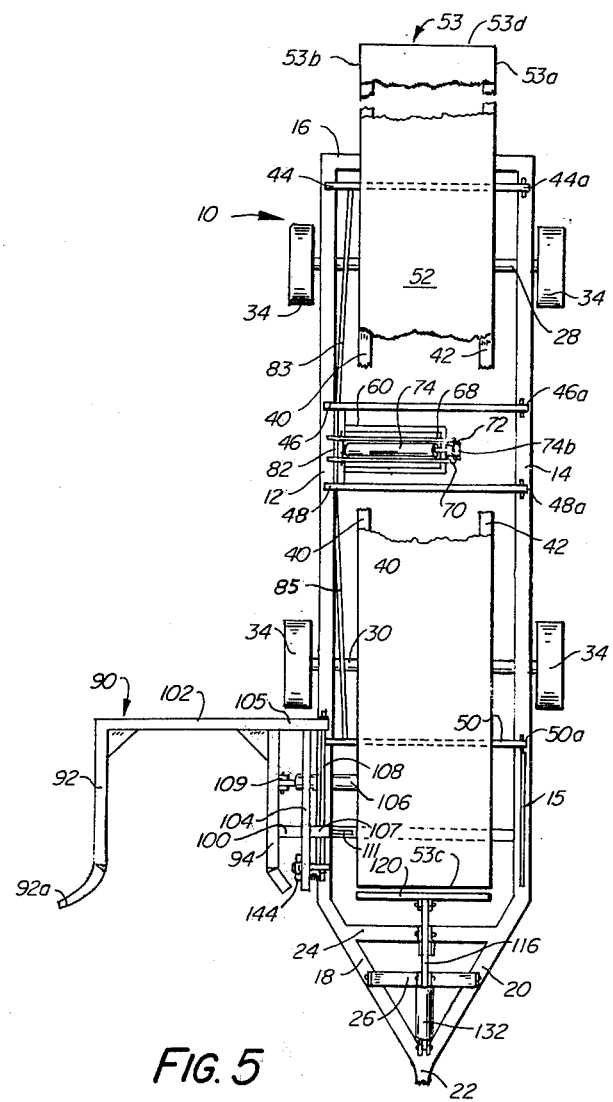
FIG. 5
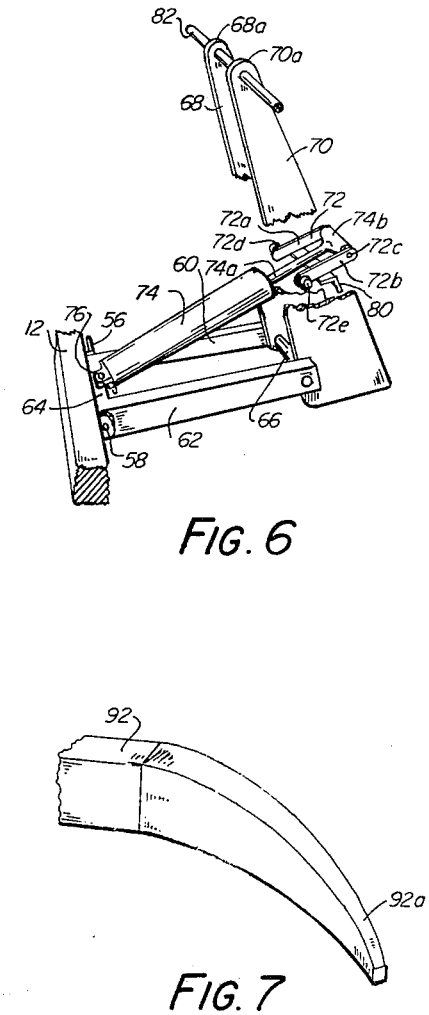
FIG. 6
FIG. 7
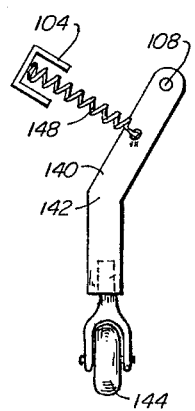
FIG. 8
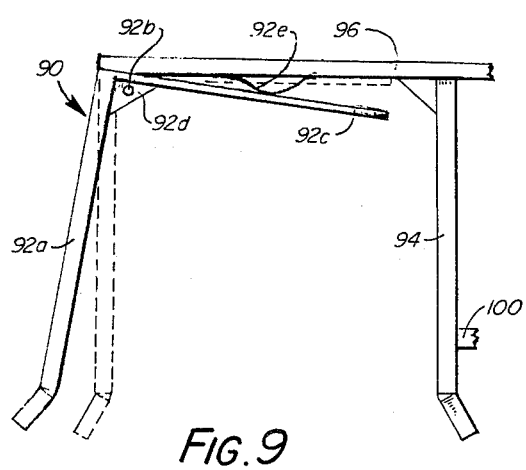
FIG. 9

BALE CARRIER

FIELD OF THE INVENTION

This invention relates to an apparatus for loading, transporting and unloading bales.

BACKGROUND

In recent years, relatively large round or cylindrical bales or agricultural products have become commonplace. They are relatively heavy, often upwards of 500 pounds, and accordingly, loading by hand is virtually impossible. As a result, a number of devices have been previously proposed for lifting and transporting the round bales. In some of these devices, a chain conveyor having lugs is used. These prior devices have certain shortcomings. One problem is that the chains or lugs have a tendency to break the twine wrapped around the bales, with the result that the bales fall apart. Moreover, a lugged chain conveyor is not always effective for picking up bales reliably. Movement of the conveyor in an effort to pick up a bale causes other bales on the carrier to be moved, with the result that undue spacing is created between bales as ultimately successfully picked up and placed on the carrier. Spaces of this kind between bales substantially reduce the capacity of the carrier; and of course, once the bales are loaded with spaces between them, any effort to bring them closer together so that an additional bale can be picked up will result in additional twine breakage caused by the lugs on the chains. Other equipment is suited only for very limited use because of its small capacity. For example, some carriers transport only one bale at a time making many trips necessary and increasing operating expenses. In still other available equipment, the cylindrical bales are carried on end. This has two disadvantages. First is the problem of lifting the bales to an upright vertical position and second is the tendency for the bales to be unstable in an upright position.

During the loading operation in some prior devices, the entire bed of the transporting vehicle or carrier must be positioned obliquely, as seen from above, with respect to the axis of the towing vehicle. In other words, the front of the carriage must be shifted obliquely toward one side of the towing vehicle to pick up the bale. This makes the equipment more complicated in construction and more subject to possible malfunction. It also makes maneuvering more difficult for the driver when approaching and picking up bales.

SUMMARY OF THE INVENTION

This invention provides a bale loading, transporting and unloading apparatus which is particularly useful for handling large bales. Illustrative bales may be composed of a variety of agricultural crops, such as grass, hay, legumes, cornstalks, straw, and the like. Large cylindrical bales of hay are probably the most common. For convenience herein, all are referred to simply as bales.

The new apparatus includes an elongated base framework mounted on wheels for vehicular movement.

An elongated bale supporting bed (sometimes called "tiltable bed structure") is aligned over and supported by the elongated base framework. It has a bale receiving station at one end thereof. It is mounted for lateral tiltable movement for dumping or unloading bales therefrom over one lateral side of the base framework. The bed is also generally characterized as having an upper surface free of obstruction to the sliding movement of bales therealong. No chains or lugs are used to accomplish such sliding movement.

A power operated bale loader is mounted on the base framework as a satellite assembly on the side of the base framework opposite the lateral side toward which the bale supporting bed is tiltable. This satellite assembly is at a location laterally adjacent the bale receiving station of the bale supporting bed. The bale loader operates to engage bales lying on the ground and lift them into the bale receiving station of the bale supporting bed.

A bale pushing means is mounted on the base framework at a longitudinal location proximate to and outwardly from the end of the bale supporting bed where the bale receiving station is located. The pushing means is extendable to engage and slide a freshly loaded bale longitudinally along the bed out of the bale receiving station of the bed. It simultaneously longitudinally slides along the bed any previously loaded bales in series contact with the bale engaged by the pushing means. The bale pushing means is retractable from engagement with a freshly loaded bale.

Selectively operable means is provided for tilting the bale supporting bed to dump bales therefrom over the aforementioned one lateral side of the base framework. The tilt movement of the bed is such that bales are dumped from it in a direction away from the side of the bed off which the bale loader is located.

THE DRAWING

The invention will further be described by reference to a drawing made a part hereof, wherein:

FIG. 1 is a schematic perspective view of one embodiment of the invention, with bales shown in phantom;

FIG. 2 is a schematic partial front elevational view of the bale loader assembly taken on line 2—2 of FIG. 1, with its elevated loading position shown in phantom;

FIG. 3 is a side elevational view of the bale pusher assembly, with its extended pushing position shown in phantom;

FIG. 4 is a schematic vertical cross-sectional view taken on Line 4—4 of FIG. 1, with the tilted position of the bale supporting bed shown in phantom;

FIG. 5 is a schematic plan view of the apparatus of FIG. 1;

FIG. 6 is a perspective view of the power lift mechanism for tilting the bale supporting bed to dump the bales therefrom;

FIG. 7 is a perspective detail of one type of tip or end for a loading tine of the bale loader assembly;

FIG. 8 is a partial front elevational view showing the illustrative load control leg on a larger scale; and FIG. 9 is a schematic partial plan view of a modified outer tine for the bale loader.

DETAILED DESCRIPTION

The base framework will be described with particular reference to FIGS 1, 4 and 5. As seen in the figures, the bale transport apparatus or vehicle is indicated generally by the numeral 10. The apparatus includes an elongated base frame composed of two longitudinally extending, laterally spaced tubular frame members 12 and 14, between which is welded a rear frame member 16. Forwardly and centrally extending frame elements 18 and 20 are connected at their forward end to a draw bar 22 for towing the apparatus. A pair of transverse cross braces 24 and 26 are spaced longitudinally on the forward framework.

Mounted transversely beneath the longitudinal frame members 12 and 14 are two support axles 28 and 30 upon which wheels 34 are mounted. Mounting brackets 36 and 38, as shown in FIG. 4, extend downwardly from frame members 12 and 14 to support the base framework above the axles. At the forward end of the base framework, and specifically mounted upon the base frame member 14, is a longitudinally extending horizontal rollover control bar 15. It is located above the forward end of the frame member 14, and is supported upon a pair of longitudinally spaced posts 15a. The rollover control bar 15 is spaced somewhat above the edge of the bed 53 to prevent a bale 54 from rolling off by mistake just after it is tossed onto the bed by the loader 90. The rollover control bar 15 can be a foot or two above the framework member 14, as required, depending upon the size of the bales and the overall size of the apparatus, as well as the tilt elevation reached by the bed 53 for lateral dumping of bales over the bar 15.

The base framework serves to support all of the remaining structure and functions as the base of the bale carrier or vehicle. While the carrier is shown in a form suited for towing behind any suitable powered vehicle, it can be self-powered for some applications if desired, in which case one or more sets of wheels should be steerable.

The bale supporting bed 53 and dumping means will now be described, by reference to the FIGS. 1, 4, 5 and 6.

Spaced illustratively centrally from frame members 12 and 14 are a pair of longitudinally extending rails or bars or tubular frame members 40 and 42. Rails 40 and 42 are secured to and supported by four generally V-shaped transverse or laterally extending, longitudinally spaced-apart, cross frame members 44, 46, 48 and 50. Rails 40 and 42 may themselves form the bale supporting bed of the apparatus; or additional or a plurality of rails of like nature, all parallelly aligned, may form the bed. It is also contemplated that the bed may be formed out of a continuous sheet of metal. Such a sheet 52 may be secured, as by welding, between the upper edges of the rail frame members 40, 42. In all cases, the bed preferably is trough-shaped or curved, such that it has a configuration approximating a segment of a cylinder. In other words, the bed is transversely concave but is substantially uniform or identical at any and all cross sections along its longitudinal direction, whether the bed is formed of rails, a smooth sheet, corrugated sheet, or otherwise. Further, the bed is relatively smooth along its longitudinal direction on its upper surface. The smoothness allows the bales, some of which are shown by dotted lines at 54, to be slid endwise, that is to say longitudinally, along the bed. Such sliding motion is accomplished by applying pressure against an end bale, as will be described below. It will be noticed that the bed 53 is bounded by right and left parallel longitudinally extending side edges 53a and 53b and by relatively short transversely extending front and rear edges 53c and 53d respectively. These edges or limits define the sides and the front and rear of the bale supporting bed 53. The showing of FIG. 1 illustrates a bed having a sufficient length for five large cylindrical bales on it. Four are shown in phantom on it; and the space for the fifth bale is at the front end of the bed. That space, which lacks a phantom bale on it, is known as the "bale receiving station" or "bale receiving space" of the bed.

Generally, a bed according to the invention should have not only a bale receiving station at one end, but sufficient additional or further length to support at least two more bales in series on it.

The cross frame members 44, 46, 48 and 50 extend laterally beyond the rails or frame members 40, 42. As viewed in FIGS. 4 and 5, the right end of each cross frame member 44–50 is pivotally secured to the base framework, and preferably to box frame member 14. The arrangement is such that the bed 53 (e.g., the sheet 52 and its supporting structure) is pivotable upwardly about pivots 44a, 46a, 48a, and 50a. The upward position for the bed is illustrated in phantom by dash lines in FIG. 4. Tilting or pivoting of the bed 53, as illustrated, permits dumping or unloading of all bales from it over one lateral side of the base framework, that is, in a lateral or side direction, and in a very rapid manner.

Referring now particularly to FIGS. 4, 5 and 6, an explanation will be given for one illustrative type of power lift mechanism for dumping the bales from the bed 53. Pivotally mounted by means of pins 56, 58 to the vehicle frame member 12 is a generally U-shaped power lift frame, having two parallel arms 60 and 62 between which is a yoke or connecting centerpiece 64. Pivoted to outer free ends of the arms 60 and 62, upon pin 66, are a pair of parallel metal plates that serve as lift arms, 68 and 70. Pivoted in turn between the arms 68 and 70 is a generally U-shaped yoke 72 having parallel arms 72a and 72b, between which extends an integral connecting pin 72c. The yoke 72 is in turn pivotally mounted between plates 68 and 70 by the provision of aligned pivot knobs or pins 72d and 72e.

One end of a hydraulic ram 74 is pivotally mounted at 76 to the yoke 64 of the power lift frame; and the other end of the ram, namely its actuator arm 74a, is connected to the pin 72c of the yoke 72 by any suitable means such as bushing 74b. The plates 68 and 70 are rigidly connected together by suitable cross members (not shown), and by an angle iron 80 which functions as a stop to limit the movement of yoke 72 on retraction of ram 74. Retraction of ram 74 causes consequent folding of lift arms 68 and 70 as a unit toward the lower parallel arms 60 and 62. The free ends 68a and 70a of the plates are connected to a pivot pin 82 that suitably extends also between the free or outer ends of the medial transverse cross members 46 and 48.

As above noted, angle iron 80 serves as a stop member. It is positioned between plates 68 and 70 in such a way that, as arms 68 and 70 fold toward arms 60 and 62 during retraction of ram 74, yoke 72 pivots clockwise as seen in FIGS. 4 and 6. It moves toward the angle iron 80 and is stopped in movement by it when arms 68 and 70 have closed about one-third of the counterclockwise distance between them and arms 60 and 62 (as seen in FIG. 6). This angle iron 80 functions as a stop or abutment which maintains the cross beam or pin 72c of yoke 72 always in a spaced relationship away from pin 66 of the lift mechanism. Especially significant is the fact that the stopped position for yoke 72 (as in the retracted state for the lift mechanism) creates the necessary triangulation for effective hydraulic ram extension of the lift mechanism. The extension force exerted by the hydraulic ram 74 forces plates 68 and 70 upwardly to the position shown in FIG. 6 (i.e., to the dash line position 84 of FIG. 4). As this happens, the pivot 66 also moves upwardly and generally toward the left (as seen in FIG. 4). Thus, ram 74 will either extend or retract the power lift arms comprising plates 68, 70. Extension tilts the bed 53 to dump the bales 54 from the bed. The entire bed pivots upwardly along the longitudinal line of pivots 44a, 46a, 48a, and 50a. The bed undergoes lateral tilt movement in dumping bales from it over one lateral side of the base framework.

For strength purposes, espcially where the bed 53 and its supporting structures are formed of the lightest possible thicknesses adequate for support of bales, it is desirable to employ longitudinally extending bridge truss rods, such as rods 83 and 85, along the side of the bed subject to the upward lift force. Such rods bind the ends of the cross frame members 44 and 50 to the locality (such as pin 82) where the lift force is applied. They also assist to transmit the lifting force applied by the power lift mechanism to the bed 53. Specifically, they aid in resisting torsion or drooping of the front and rear of the bed when the lift mechanism applies an upward force on pin 82. In this way the bale supporting bed is given adequate strength but may nevertheless be formed of relatively thinner or weaker materials in many parts as compared to the strength and thicknesses which would otherwise be required.

Now reference is made particularly to FIGS. 1, 2, and 5 for the purpose of describing the loader indicated generally by the numeral 90. All positions and directions will be given with reference to the loader in the loading position shown in solid lines in FIG. 2, except as specifically otherwise noted. As seen in the figures, the loader 90 comprises a rigid supporting framework including a pair of longitudinally extending, laterally spaced apart tines 92 and 94 secured at their rearward ends to cross frame member 96. The tines extend forwardly of cross frame 96 and are aligned in substantially the same horizontal direction as the elongated bed 53. The inward or medial end of the cross frame member 96 extends inwardly a further short distance 96a from tine 94, and is united or welded to an upright 98. Similarly, an L-shaped bracket 100 extends inwardly a short lateral distance from a medial portion of the medial tine 94, and then projects upwardly. A diagonal reinforcing member 102 extends from the outer end of cross member 96 to the upper part of upright 98. The upper ends of upright 98, and of bracket 100, are united to an elevated longitudinally extending beam 104 which also functions as a guide beam or bar for the medial or inward side of a bale being picked up by the loader. Arms 105 and 107 project medially inward from beam 104 toward the base framework of the apparatus. The medial or inwardly terminal ends of the arms 105 and 107 are both hinged by means of an elongated pivot pin 108 to the base frame member 12.

The loader 90 is elevated during operation by means of a suitable power unit such as a ram 106 pivoted at one end to the lower surface of the base frame member 12 and at its other or arm end to the loader tine 94 at 109. When the loader 90 is raised to its uppermost position (shown by dash lines in FIG. 2), the mounting arm 107 pivots upward and strikes stop 111 on the vehicle framework. The stop 111 prevents further elevation of the loader 90.

The loader 90 is lowered so that tines 92, 94 rest on the ground for loading a bale.

Bales lying in a field are picked up by running the carrier forwardly so that arms 92 and 94 are moved beneath lateral portions of the bale. The medial or inward horizontal guide beam 104 (on members 98 and 100) defines the medial or inner side of the loader. The medial tine member 94 is spaced laterally (i.e, outwardly) from the inner side wall or guide beam 104 of the loader.

The pusher assembly will now be described by reference to FIGS. 1 and 3. The bale pusher assembly indicated generally by the numeral 110 includes an upright parallelogram linkage in alignment with the elongated bale supporting bed. It is mounted on the base framework at a longitudinal location proximate to the end of the bed 53 at which the bale receiving station is located. Its location is longitudinally outward from the end of the bed where the satellite bale loader 90 is located. Its parallelogram linkage is composed of uprights 112, 114 and 115 and a horizontally disposed upper or top link 116 which includes a diagonally downward extending integral pusher arm 118 having a pusher plate member 120, suitably of rectangular shape, pivotally connected to its outer or free end at 122. It is preferred that the pusher plate be so mounted or weighted that it is heavier at its lower end. This facilitates vertical orientation for it at all times. The parallelogram linkage arms 112, 114 and 115 are pivotally connected to the framework by means of spaced apart pivots 124, 126 and 127, respectively. The upper ends of the arms are in turn pivotally connected to the horizontal link 116 by two pivots 128 and 130. In essence, the spacing of upright arms 114 and 115 is solely for maintaining upright stability for the parallelogram linkage; and links 114 and 115 are suitably looked upon as a single linkage arm in the parallelogram analogy. Thus the parallelogram includes a pair of generally vertically extending substantially parallel upright links 112 and the combination of 114 and 115. These are pivotally mounted in spaced relationship at their lower ends to the base framework (e.g., at location 124 spaced longitudinally from the combination of 126 and 127). Horizontal top link 116 is pivotally connected to the upright links and continues as an extension toward the bale receiving station of the bed 53.

A suitable power actuator such as a hydraulic ram 132 is operatively (e.g., pivotally) connected between the base framework at 134 and one of the upright link arms as at 136. When the hydraulic ram 132 is extended, the pusher 120 moves from the solid line retracted position shown in FIG. 3 toward and beyond the end 53c of the bed to the dash line position 138. When in the retracted position, the pusher assembly is out of the way so that bales can be loaded onto the bed 53 or dumped therefrom without striking any part of the pusher assembly. When the ram 132 is extended, the freshly loaded bale (and all previously loaded bales 54 in series contact) is slid longitudinally and rearwardly on the bed 53 (i.e., toward the rearward marked edge 53a in FIG. 5). Each successive bale after being freshly loaded on the bed is forced rearwardly by extension of the ram 132 and the resulting extension of the pusher 120. Since the bales are all moved rearwardly by pressure from the endmost freshly loaded bale, there will never by any spaces between the bales on the bed; and the bales will always be compacted tightly together maximizing the capacity of the carrier. As soon as the most freshly loaded or forwardmost bale has been slid rearwardly far enough so that a new bale can be loaded, the pusher is retracted to the solid line position of FIG. 3. Another bale can then be picked up by the loader 90. Since no chain conveyor is needed to move the bales on the carrier, there is little likelihood that the twine holding the bales together will ever be broken.

Refer now to FIG. 7, which shows the detail of the tip or forward end for one type of tine 92. The tip 92a extends outwardly, and optionally slightly downwardly, from the shaft of the tine 92. While illustrated as having a slight curvature, tips or ends which angle straight outwardly (i.e., in a distal direction away from the central loading area of the loader) are also useful. The distal projection of the tip facilitates bale pick-up without tine penetration into the mass of the bale (i.e., without penetration inside the twine winding about the bale).

An optional but useful control means for resisting tipping motion of the carrier during the loading of a first bale thereon will now be described by reference to FIGS. 1, 5 and 8. Mounted for pivotal movement at a forward location on the pin 108 is a load control leg 140 which projects laterally outwardly from the base framework and then downwardly. The leg suitably has a bend 142 at a medial location along its length. If desired, a wheel may be mounted on the lower end of the leg; and a castor wheel 144 is suitable. A spring 148 may be connected between the leg 140 and the loader frame medial guide member or beam 104. During use, when loader 90 is in its solid line position of FIG. 2, leg 140 depends downwardly. As a bale is lifted by the loader, leg 140 rests upon the ground, thereby contributing to stabilization of the apparatus against tipping. When the loader 90 is in its dash line position shown in FIG. 2, the bale lifted by it rolls into the bed 53. That removes the weight of the bale from the loader. Simultaneously, spring 148 (which became distended as loader member 104 moved upwardly in the action of loading a bale) causes the leg 140 to be pivoted upwardly into an out-of-the-way position for movement of the carrier to the next bale to be picked up. The arrangement also permits travel to and from the field with the loader in the elevated dash line position of FIG. 2, and with the load control leg 140 likewise in an elevated out-of-the-way position.

A modified form of loader tine is shown in FIG. 9 wherein the same numerals refer to corresponding parts already described. In this embodiment, the outermost tine member 92a is connected by means of a pin 92b to the outer end of the cross member 96 for pivotal movement about a vertical axis. Secured rigidly to the rearward end of the tine arm 92a and projecting laterally between the tine 92a and 94 is a bale contacting lever 92c. The connection between lever 92c and the tine 92a is reinforced by means of a web 92d. A spring such as leaf spring 92e may be secured between the cross member 96 and the lever 92c to urge and retain tine 92a normally in the solid line position of FIG. 9. As tines 92a and 94 are moved forwardly under edges of a bale for pick up, the rearward end of the bale between the tines presses the lever 92c toward cross member 96, causing tine 92a to pivot to the dash line position of FIG. 9. This arrangement desirably causes the forward ends of the tines to easily pass on either side and under edges of a bale to be picked up; and this is true even for bales that have been resting on the ground for some time and become somewhat flattened or spread out.

For simplicity of illustration, the hydraulic hoses and control elements have not been shown in the drawings. Typically, control is effected from an operator's position on a tractor or other towing vehicle.

In use, the carrier 10 is towed to a location where a bale resting on the ground is to be picked up. The loader 90 is lowered to its solid line position of FIG. 2, and the carrier is towed forwardly so that tines 92, 94 move under edge portions of the bale. Hydraulic ram 106 is then actuated to lift the bale. The extreme weight of the bale places downward pressure on the load control leg 140, which then functions to support the carrier against tipping. As loader 90 lifts the bale upwardly onto the front end of the bed 53 (in the bale receiving station of the bed), the spring 148 for the control leg becomes stretched, but the load control leg remains pressed upon the ground until the bale 54 leaves the loader and rests in the bale receiving station of the bed. Then leg 140 is drawn upwardly by stretched spring 148. The ram 132 of the pusher assembly 110 is then actuated to slide the freshly loaded bale along bed 53 out of the bale receiving station so as to make room for the loading of a new or fresh bale on the bed. The pusher is then retracted. Additional bales are loaded and pushed along the bed until the bed is filled. Normally, the apparatus will be designed with a bed long enough to accommodate five of the large and heavy cylindrical bales. After the bed 53 is filled, the operator tows the carrier filled with bales to any desired location. Towing is normally accomplished with the loader 90 in its upward or elevated position and the pusher 110 retracted. Almost instantaneous unloading or dumping of all the bales from the carrier is accomplished by actuating the hydraulic ram 74 of the bed tilting mechanism, which causes the bed 53 to tilt or pivot to one side and dump all bales off the side of the carrier opposite that side on which the loader 90 is mounted.

It will thus be understood that the tiltable bed 53, which serves as the slide surface, cooperates with the pusher assembly 110 to enable the bales to be very compactly nested on the bed. The provision for tilting the bed and dumping the bales over the side edge opposite the loader allows the loader 90 to be placed in a convenient position for picking up bales, but one which will not interfere with the function of either the dumping or pushing operation. These benefits are achieved by locating the loader on one side of the bed and by providing means for dumping the bales off the bed on the opposite side from the loader, in combination with a pusher assembly longitudinally off the end of the bed adjacent the loader. The combination permits reliable and speedy loading, transporting and dumping of a plurality of bales with great economy of manpower. Only one operator is required.

A benefit arising in use of this apparatus in that the watershed orientation of bales remains the same after moving them. Before they are moved, while on the ground with part of their cylindrical surface touching the ground, most of that surface and both ends are exposed to weathering. Rain wets and sun drys the exposed surfaces. It is desirable to maintain that same relative surface orientation after moving them. With this apparatus, loading causes the round bales to make at least about a one-third or even as much as about a one-half turn or rotation; and unloading causes a further approximately one-half turn or even about a two-thirds rotation, for the lateral tilt unloading causes a roll of the bales and they normally settle on their relatively flattened side which previously rested on the ground. Thus, the loaded and unloaded bales normally undergo a full rotation, and end up in approximately their original rotational or watershed orientation.

What is claimed is:

1. A bale loading, transporting and unloading apparatus comprising,
   (a) an elongated base framework mounted on wheels for vehicular movement, (b) an elongated bale supporting tiltable bed structure aligned over and supported by said elongated framework, and tiltable bed structure having a bale receiving station at one end thereof and sufficient further length to support at least two additional bales in series along the length thereof, said tiltable bed structure being mounted on the base framework for lateral tiltable movement for dumping bales therefrom over one lateral side of the base framework, said tiltable bed structure being entirely devoid of means for effecting any sliding movement of bales therealong, (c) a power operated bale loader for engaging a bale lying on the ground and lifting it into the bale receiving station of the bale supporting tiltable bed structure, said loader being mounted on the base framework as a satellite assembly on the side of the base framework opposite said one lateral side thereof and at a location laterally adjacent the bale receiving station of said tiltable bed structure, (d) power operated bale pushing means mounted upon the base framework at a longitudinal location proximate to and outwardly from the end of said tiltable bed structure having said bale receiving station, said pushing means being separate from said tiltable bed structure and extendable over said tiltable bed structure to engage and slide a freshly loaded bale longitudinally along said tiltable bed structure out of the bale receiving station while simultaneously longitudinally sliding along said tiltable bed structure any previously loaded bales in series contact with the bale engaged by said pushing means, said bale pushing means being retractable from said engagement with a freshly loaded bale, and (e) selectively operable means for laterally tilting the bale supporting tiltable bed structure to dump loaded bales therefrom over said lateral side of the base framework.

2. The apparatus of claim 1 wherein said bale supporting tiltable bed structure comprises parallel rails which form an upper surface free of obstruction to the sliding movement of bales therealong.

3. The apparatus of claim 1 wherein said bale supporting tiltable bed structure comprises a substantially continuous plate member having an upper surface free of obstruction to the sliding movement of bales therealong.

4. The apparatus of claim 1, 2 or 3 wherein said bale supporting tiltable bed structure is transversely concave and substantially uniform in cross-sections taken along its longitudinal direction.

5. The apparatus of claim 1 wherein said power operated bale loader includes a supporting framework with two forwardly extending horizontally disposed and spaced apart tine members for sliding underneath edge portions of a bale lying on the ground, said tine members being aligned in substantially the same horizontal direction as said elongated bed.

6. The apparatus of claim 5 wherein the outermost forward end portions of said tine members are more greatly spaced apart than the remaining shaft portions thereof.

7. The apparatus of claim 1, 2, or 3 wherein said bale pushing means comprises an upright parallelogram linkage in alignment with said elongated bale supporting tiltable bed structure and including at least a pair of generally vertically extending substantially parallel upright links pivotally mounted at their lower ends to the base framework, a horizontally extending top link pivotally connected between the upper ends of the upright links and continuing as an extension therefrom toward said bale receiving station of said tiltable bed structure, a pushing member connected to said outer end extension of said top link, and power means operatively connected between the base framework and one of said upright links for effecting movement of said pushing member in a back and forth direction aligned with said elongated tiltable bed structure.

8. The apparatus of claim 1, 2, or 3 wherein said selectively operable means for tilting the bale supporting tiltable bed structure comprises an expandable assembly mounted for expansion between a side location on said base framework and a side location on said bale supporting tiltable bed structure, each said side location being opposite said one lateral side of said base framework and being medially between the ends of said tiltable bed structure, and power means for expanding said enpandable assembly.

9. The apparatus of claim 1 additionally comprising a rollover control member mounted on said one lateral side of said base framework at a location transversely opposite said bale loader.

10. The apparatus of claim 1 additionally comprising a control means for resisting tipping motion of said apparatus during the loading of a first bale thereon.

11. A bale loading, transporting and unloading apparatus comprising, (a) an elongated base framework mounted on wheels for vehicular movement, (b) an elongated bale supporting tiltable bed structure having an upper surface for supporting bales, said tiltable bed structure being free of means for effecting the sliding movement of bales therealong, said elongated tiltable bed structure being aligned over and supported by said elongated base framework, said tiltable bed structure having first and second relatively long opposing side edges, (c) a power operated bale loader mounted upon the base framework adjacent said first side edge of the tiltable bed structure for engaging a bale located on the ground and lifting it onto the tiltable bed structure, said bale loader also being located adjacent to one end portion of said tiltable bed structure, (d) a bale pusher mounted upon the base framework at a longitudinal location proximate to and outwardly from the end of the tiltable bed structure where said bale loader is located, said pusher being separate from said tiltable bed structure and extendable over said tiltable bed structure to engage and slide a freshly loaded bale longitudinally along said tiltable bed structure in a direction away from said bale loader while simultaneously longitudinally sliding any previously loaded bales in the same direction on the tiltable bed structure, said bale pusher being retractable from said engagement with a freshly loaded bale, and (e) means for laterally tilting said tiltable bed structure to thereby dump the bales loaded upon the tiltable bed structure over said second relatively long side edge of said tiltable bed structure in a lateral direction away from said bale loader.

12. The apparatus of claim 11 wherein said means for dumping the bales comprises a hinged connection between the elongated bale supporting tiltable bed structure and the base framework, said hinged connection having its axis parallel and proximate to said second side edge of the tiltable bed structure, and lift means operatively connected between the base framework and said first side edge of said tiltable bed structure for laterally tilting the tiltable bed structure upwardly about said hinged connection.

13. The apparatus of claim 12 wherein the bale supporting tiltable bed structure comprises at least two longitudinally extending laterally spaced apart elongated rail members extending substantially the length of the tiltable bed structure, a plurality of transversely extending longitudinally spaced apart cross frame members affixed to the underside of said rail members and supporting said rail members, and longitudinally extending bridge truss bars connected between lateral ends of the cross frame members along the first side edge of the tiltable bed structure opposite said hinged connection proximate to said second side edge.

14. The apparatus of claim 11 wherein said bale supporting tiltable bed structure comprises a substantially continuous plate member.

15. The apparatus of claim 11, 12 or 14 wherein said bale supporting tiltable bed structure is transversely concave and substantially uniform in cross-sections taken along its longitudinal direction.

16. The apparatus of claim 11 wherein said bale loader comprises at least two forwardly extending substantially horizontal tines, at least one of said tines being pivotally connected at its rearward end for pivotal movement about a vertical axis, and bale contacting means fixed to said pivotally connected tine for pivoting the same into a substantially parallel condition with the other of said tines during pick-up of a bale.

17. A bale loading, transporting and unloading apparatus comrising an elongated base framework mounted on wheels, an elongated bale supporting tiltable bed structure aligned over and supported by the base framework, said tiltable bed structure being free of means for effecting the sliding movement of bales therealong, a power operated bale loader mounted on one side of the base framework as a satellite assembly near one end of the bale supporting tiltable bed structure, power operated bale pushing means mounted upon the base framework so that said pushing means is at a longitudinal location proximate to and outwardly from and entirely separate from the end of the bale supporting tiltable bed structure at which the bale loader is located, and selectively operable means for laterally tilting the bale supporting tiltable bed structure to dump loaded bales therefrom over the lateral side of the base framework opposite the bale loader.

18. A bale loading, transporting and unloading apparatus comprising, (a) an elongated base framework mounted on wheels for vehicular movement, (b) an elongated bale supporting bed aligned over and supported by said elongated base framework, said bed having a bale receiving station at one end thereof and sufficient further length to support at least two additional bales in series along the length thereof, said bed being mounted on the base framework for lateral tiltable movement for dumping bales therefrom over one lateral side of the base framework, (c) a power operated bale loader for engaging a bale lying on the ground and lifting it into the bale receiving station of the bale supporting bed, said loader being mounted on the base framework as a satellite assembly on the side of the base framework opposite said one lateral side thereof and at a location laterally adjacent the bale receiving station said bed, (d) power operated bale pushing means mounted upon the base framework at a longitudinal location proximate to the end of said bed having said bale receiving station, said pushing means being extendable to engage and slide a freshly loaded bale longitudinally along said bed out of the bale receiving station while simultaneously longitudinally sliding along said bed any previously loaded bales in series contact with the bale engaged by said pushing means, said bale pushing means being retractable from said engagement with a freshly loaded bale, said bale pushing means comprising an upright parallelogram linkage in alignment with said elongated bale supporting bed and including at least a pair of generally vertically extending substantially parallel upright links pivotally mounted at their lower ends to the base framework, a horizontally extending top link pivotally connected between the upper ends of the upright links and continuing as an extension therefrom toward said bale receiving station of said bed, a pushing member connected to said outer end extension of said top link, and power means operatively connected between the base framework and one of said upright links for effecting movement of said pushing member in a back and forth direction aligned with said elongated bed, and (e) selectively operable means for tilting the bale supporting bed to dump loaded bales therefom over said one lateral side of the base framework.

19. The apparatus of claim 17, wherein, (a) said elongated bale supporting tiltable bed structure has an upper surface which is transversely concave along its length for the support of cylindrical bales, and has a bale receiving station at said one end at which the bail loader is located, and has a total length sufficient to support at least four cylindrical bales in addition to any cylindrical bale supported in said bale receiving station, (b) said power operated bale loader comprises means for engaging a cylindrical bale lying on the ground and means for lifting the cylindrical bale for deposit of the cylindrical bale in said bale receiving station with the axis of the cylindrical bale aligned with the length of said tiltable bed structure, and (c) said power operated bale pushing means is extendable over said tiltable bed structure to engage and slide a freshly loaded cylindrical bale longitudinally along said tiltable bed structure out of said bale receiving station while simultaneously causing all previously loaded cylindrical bales on said tiltable bed structure as well as said freshly loaded cylindrical bale to be in end-to-end series contact with each other and to slidingly move as a group longitudinally along said tiltable bed structure, said pushing means being retractable from said engagement with a freshly loaded bale.

* * * * *

UNITED STATES PATENT AND TRADEMARK OFFICE
CERTIFICATE OF CORRECTION

PATENT NO. : 4,261,676
DATED : April 14, 1981
INVENTOR(S) : Bernard L. Balling, Sr.

It is certified that error appears in the above-identified patent and that said Letters Patent are hereby corrected as shown below:

In the Abstract:

Line 8, between "bale" and "mounted", insert --pusher--.

In the Specification:

Col. 1, line 11, "or" should read --of--.

In the Claims:

Re Claim 1, at Col. 9, line 3, "and" should read --said--.

Re Claim 17, at Col. 11, line 36, "comrising" should read --comprising--.

Re Claim 18, at Col. 12, line 37, "therefom" should read --therefrom--.

Signed and Sealed this

Twenty-third Day of June 1981

[SEAL]

Attest:

RENE D. TEGTMEYER

Attesting Officer

Acting Commissioner of Patents and Trademarks